United States Patent [19]

Lawson

[11] 3,875,557
[45] Apr. 1, 1975

[54] HEADLIGHT WARNING SYSTEM FOR VEHICLES

[76] Inventor: Edward L. Lawson, 538 N. Fifth St., Bayport, Minn. 55003

[22] Filed: Apr. 1, 1974

[21] Appl. No.: 456,964

[52] U.S. Cl................................. 340/52 D, 315/82
[51] Int. Cl............................................... B60q 5/00
[58] Field of Search........ 340/52 D; 315/77, 80, 82, 315/84

[56] References Cited
UNITED STATES PATENTS
2,773,249  12/1956  DeSantis........................... 340/52 D Primary Examiner—Alvin H. Waring
Attorney, Agent, or Firm—Stuart R. Peterson

[57] ABSTRACT

The fuse in the tail lamp circuit of a vehicle is replaced with an auxiliary circuit containing its own fuse, voltage dropping resistance means, a low voltage buzzer and a mercury switch. The buzzer and switch are connected in series across the resistance means. The mercury switch is adhesively attached to the underside of the gearshift housing so that the switch is always closed when the gearshift lever is in "Park" position. Since a vehicle's headlight switch, when closed, normally energizes the tail lamps as well as the headlights, if the headlight switch is inadvertently left closed, and the headlights thus energized, as soon as the shift lever is moved into "Park" position, then the buzzer sounds. In this way, the motorist is warned that his headlights have not been turned off.

13 Claims, 5 Drawing Figures

TO HEADLIGHTS

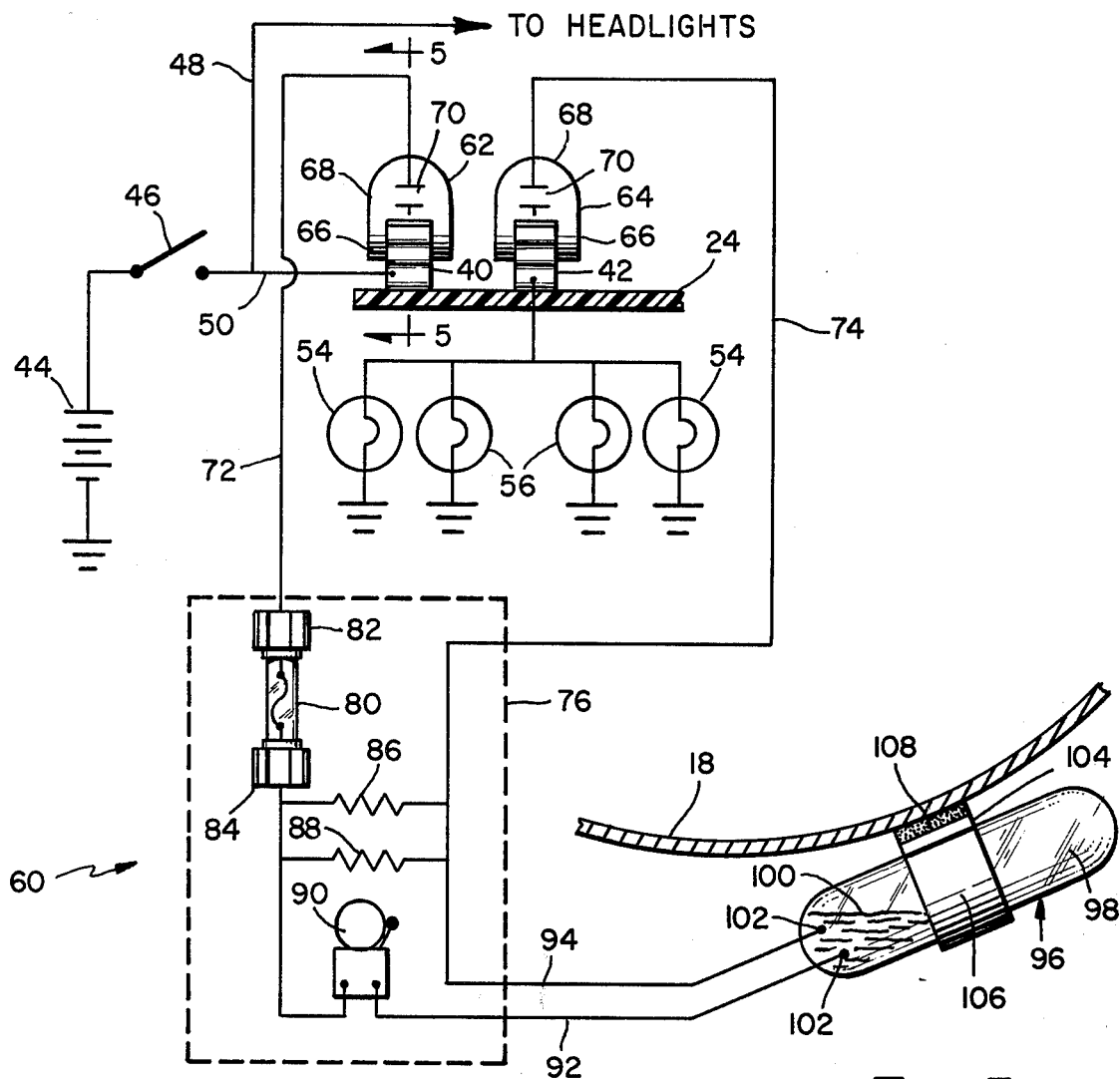
Fig 4
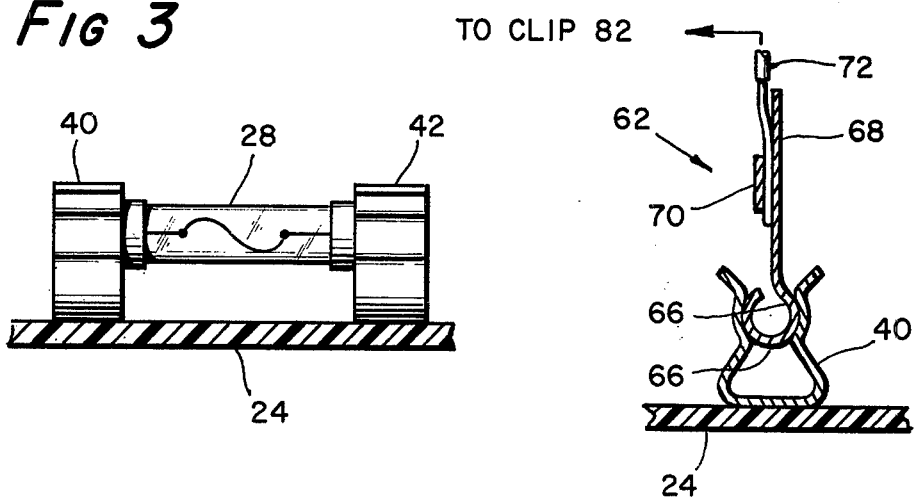
Fig 3
Fig 5

HEADLIGHT WARNING SYSTEM FOR VEHICLES

BACKGROUND OF THE INVENTION

1. Field of the Invention

This invention relates generally to headlight warning systems for vehicles, and pertains more particularly to such a system that can be connected into the vehicle's lighting circuitry by first removing the fuse that normally protects the vehicle's tail lamps.

2. Description of the Prior Art

Inasmuch as many motorists are at times apt to leave their headlights on when parking their vehicles at dawn or on stormy days, various attempts have been made in the past to remind the motorist that he has inadvertently failed to turn off his headlights. The problem is quite troublesome in that if the vehicle is left unattended for any length of time, the energized headlights can drain the battery, frequently to the extent that the vehicle cannot be restarted when the motorist returns. While a number of the prior art arrangements have operated satisfactorily, they have been quite difficult for the average person to install. This has militated against any widespread use of such warning systems.

SUMMARY OF THE INVENTION

Accordingly, a very real need still exists for a system that will be simple and easily installed by the motorist himself. More specifically, the present invention contemplates the removal of the fuse from the vehicle's fuse block that services the tail and parking lamps. In this way, the motorist need not understand the factory-installed electrical wiring which can vary quite widely from manufacturer to manufacturer and even between models of a given manufacturer.

Another object of the invention is to provide a system of the foregoing character that makes use of a mercury switch that can be readily attached to the underside of the gearshift housing, more particularly in a manner so that it is closed each time the gearshift lever is moved to its "Park" position.

Another object of the invention is to provide a headlight warning system that does not sacrifice the protection that is provided by the tail lamp fuse prior to its removal, the system embodying an auxiliary fuse which safeguards the circuit in the same manner as before the installation of my system.

Yet another object is to provide a headlight warning system that will be quite inexpensive, thereby encouraging its purchase and use.

Briefly, the usual cartridge-type fuse in the tail lamp circuitry of the vehicle is removed from the fuse block and in substitution therefor a pair of contact members are pressed into the resilient clips that normally releaseably retain the cartridge-type fuse. Connected in series with the contact members is at least one resistor, preferably two or more, of sufficient current carrying capacity so as to provide only a small voltage drop, suggestively on the order of one volt or so. The resistor (or resistors) are connected in series with an auxiliary fuse that still functions to protect the tail and parking lamp circuits. The resistor (or resistors) by reason of the voltage drop provides a sufficient voltage, even though small, to energize a warning buzzer when a mercury switch is closed. The mercury switch, however, is closed only when the shift lever is in "Park" position, it being planned that the mercury switch be properly adhered, such as by means of pressure sensitive adhesive, to the underside of the shift lever housing. The motorist can readily attach the mercury switch so that it is always closed when the shift lever is in the "Park" position, yet open when it is in any other position. In this way, when the headlight switch, which also supplies power to the tail and parking lamps, is closed, when the mercury switch is also closed, then the low voltage buzzer is sounded and the motorist is immediately reminded that he has not turned off his headlights.

BRIEF DESCRIPTION OF THE DRAWINGS

FIG. 3 is a detail view taken in the direction of line 3—3 of FIG. 2 for the purpose of illustrating the two fuse clips that normally releaseably retain the cartridgetype fuse that protects the tail and parking lamp circuits;

FIG. 4 is a view showing the fuse clips of FIG. 3 but with the usual fuse removed and special electrical contacts substituted therefor which lead to the circuitry constituting my headlight warning system, and FIG. 5 is a sectional view taken in the direction of line 5—5 of FIG. 4 for the purpose of illustrating the preferred configuration of one of the removal contact members utilizied when practicing my invention.

DESCRIPTION OF THE PREFERRED EMBODIMENT

Figure 1:
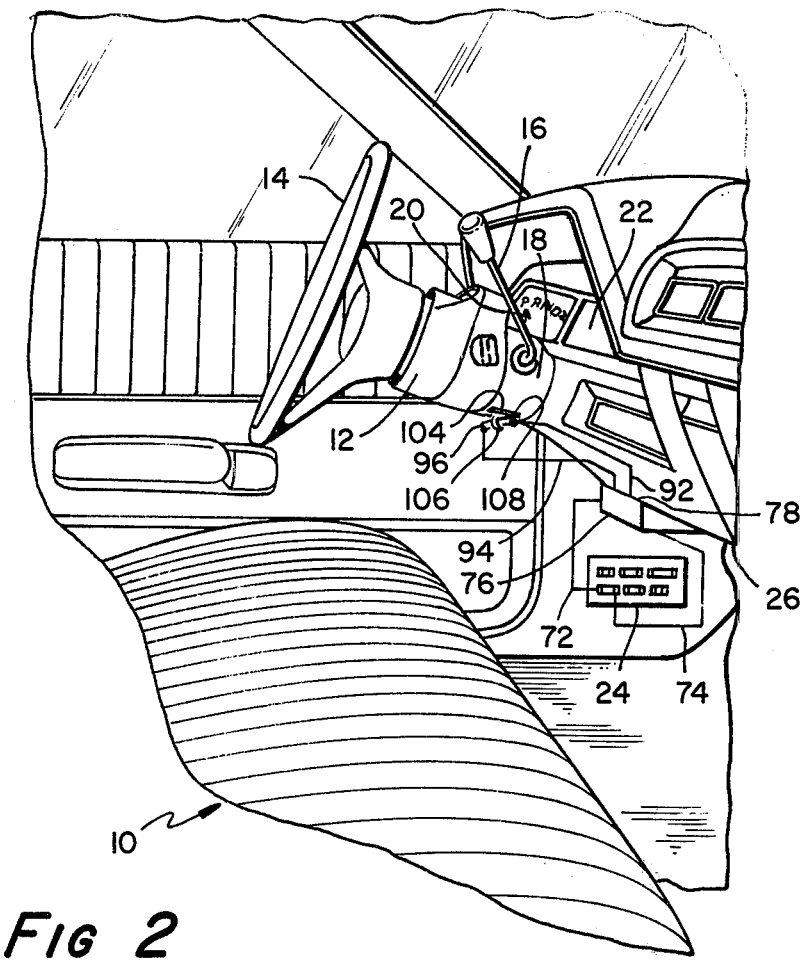
FIG. 1 is a perspective view of the driver's side of a typical automobile having my headliht waring system installed therein.

Referring first to FIG. 1, a fragmentary portion of a vehicle denoted generally by the reference numeral 10 has been illustrated. Included in FIG. 1 is a conventional steering column 12 having the usual steering wheel 14 and a gearshift lever 16 that extends from the gearshift or shift lever housing 18 that is rotated when the lever 16 is shifted. Also extending from the gearshift or shift lever housing 18 is a gearshift indicator pointer 20 that moves relative to the instrument panel 22 on which the various shift positions are denoted. It will be understood as the description progresses that the invetnion is intimately concerned with the so-called "Park" position. There are various other positions that are utilized during the operation of the vehicle; as is conventional, there are "Reverse," "Neutral," "Drive," "2" and "1" positions. Other than the "Park" position, the alluded to positions are all operational conditions of the vehicle in which my headlight warning system (yet to be referred to) remains inactive or ineffectual.

Figure 2:
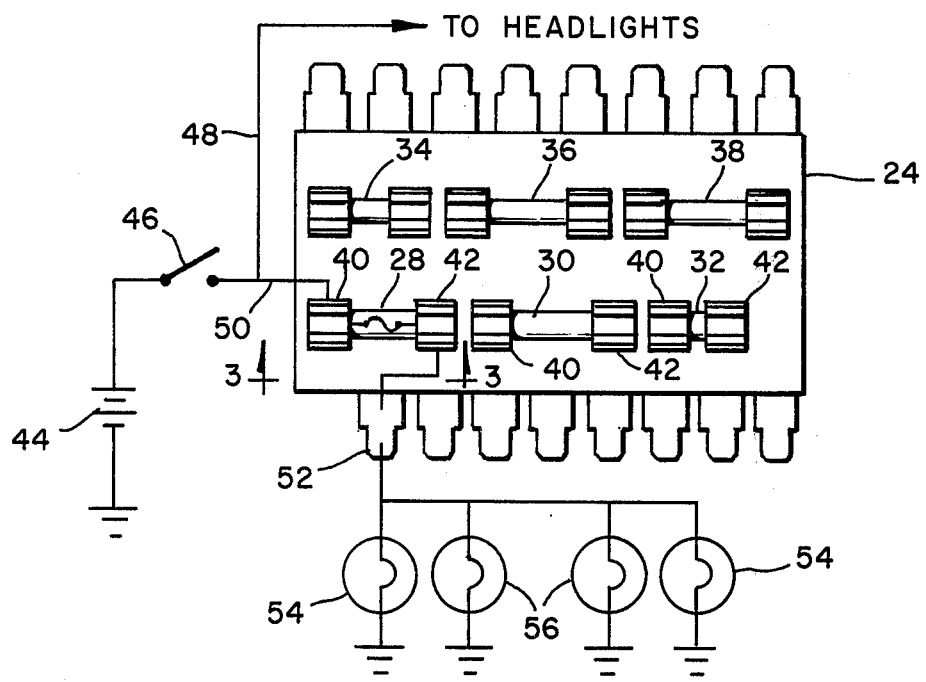
FIG. 2 is an enlarged view of the fuse block appearing in FIG. 1 with a sufficient portion of the vehicle's lighting system connected thereto so as to provide a basis for understanding my invention.

In understanding and appreciating the benefits to be derived from my invention, attention is directed at this time to the fuse block 24 that is normally concealed by the dashboard 26 of the vehicle 10. In this instance, the fuse block 24 is located sufficiently beneath the dashboard 26 so as to expose it to view in FIG. 1. The scale of FIG. 1 does not enable the fuse block 24 to be referred to in detail; however, the fuse block 24 appears on an elarged scale in FIG. 2. It will be discerned from FIG. 2 that the fuse block there shown contains six fuses. The fuse labeled 28 that protects the tail and parking lamps is the one that we are concerned with as far as the present invention is concerned. For the sake of completeness, the other fuses have been identified by the reference numerals 30, 32, 34, 36 and 38. The fuse having the reference numeral 30 protects the fan, the fuse 32 the gauges, the fuse 34 the dome and clock, and fuse 36 the stoplight, and the remaining fuse 38 the various accessories that are included in the vehicle 10. Although not shown too clearly in FIG. 2, it will be understood that a pair of fuse clips 40, 42 is associated with each of the fuses 28–38. The clips 40, 42 that releasably hold the fuse 28 that protects the tail and parking lamps are shown to better advantage in FIGS. 3 and 4, the fuse clip 40 also appearing in FIG. 5.

In order to understand the invention yet to be described, it will be helpful to include various components of the vehicle's lighting circuitry. Therefore, the car battery has been given the reference number 44, having its negative side grounded and its positive side connected to the headlight switch 46. A conductor 48 extends from the headlight switch 46 to the headlights (not shown). A second conductor 50 extends to the fuse clip 40 that normally retains one end of the fuse 28. The other clip 42 for the fuse 28 is electrically connected to a terminal 52 to which is connected the various tail and parking lamps labeled 54 and 56.

Having prefaced the description of the invention with the foregoing background material, reference can be made to FIG. 4 which schematically portrays my plug-in headlight warning system which has been designated in its entirety by the reference numeral 60. It includes a pair of contact members 62, 64 that are inserted into the two clips 40, 42 in lieu of the ends of the cartridge fuse 28 that is first removed. The configuration of the contact members 62, 64 can best be understood from FIG. 5. In this regard, the member 62 constitutes a section of sheet metal that is stamped and rolled so as to form a cylindrical or barrel portion 66 having a diameter corresponding substantially to that of the fuse 28 that is removed. There is a tongue 68 functioning as a terminal that has a strip section 70 struck therefrom so that each contact member 62, 64 is capable of having attached thereto one end of an electrical conductor. The end of the conductor in each instance can be crimped or soldered to the respective contact member, the conductor attached to the contact member 62 being identified by the numeral 72 and the conductor attached to the contact member 64 by the numeral 74.

The conductor 72, 74 extend to a box 76 shown pictorially in FIG. 1; however, the box 76 could constitute a panel member. At any rate, the box 76 has a pressure sensitive adhesive coating 78 on one face thereof which is used is mounting the box to the underside of the dashboard 26. The box 76 is shown only in phantom outline as far as FIG. 4 is concerned.

Describing now in detail the components contained within the box 76, it is to be observed that the conductor 72 leads to an auxiliary fuse 80, which can be the same fuse shown in FIG. 3, or a fuse of comparable value, which is releasably retained by a pair of resilient clips 82, 84, having a spacing corresponding to the clips of FIG. 3. Whereas the conductor 72 connects with the clips 82, the other clip 84 is electrically connected to one end of a pair of resistors 86, 88 that are in parallel with each other, the other ends thereof being connected to the conductor 74. The resistor 86, 88 should have a fairly low value of resistance in order to provide only a smally voltage drop thereacross. In actual practice, the resistors 86, 88 each had a resistance of one ohm resistors and a rating of 10 watts. The wattage rating, of course, is representative of the amount of current that the resistors are capable of having pass therethrough. The resistive value of the resistors is of importance in that a sufficient voltage drop should be produced for energizing a buzzer labeled 90. Buzzers are currently available that will operate on from 0.75 to 1.5 volts.

While the buzzer 90 is contained in the box 76, there are additional conductors 92, 94 extending from the box to a mercury switch 96. The mercury switch is conventional, comprising a glass envelope 98 containing therein a globule of liquid mercury 100 and having a pair of terminals 102 to which the conductors 92, 94 are connected. In the illustrated instance, the mercury switch 96 is mounted on a small panel board or strip 104 by means of a U-shpaed clip 106. The panel board or strip 104 is provided with a layer of pressure sensitive adhesive 108 corresponding to the pressure sensitive adhesive 78 applied to the box 76. In this way, the panel board 104 can be appropriately secured to the underside of the gearshift housing 18 that has already been alluded to.

Although the wires or conductors 72, 74 are shown as individual ones, it will be recognized that they can be paired to form a cable; similarly, the conductors 92, 94 can be paired to form a different cable. In this way, all of the conductors 72, 74, 92, 94 can be made relatively inconspicuous and can be taped to portions of the vehicle 10 so that they do not dangle as might be assumed when examining FIG. 1.

The installation procedure is amazingly easy, this being one of the prime attributes of my invention. All that the motorist need do is to remove the tail lamp fuse 28 and substitute therefore the two contact members 62, 64. A comparison of FIG. 3 with FIG. 4 illustrates the sheer simplicity that is involved as far as this substitution is concerned. The only remaining step necessary is to adhere properly the mercury switch 96 so that it remains closed, that is tilted so that the terminals or contacts 102 are bridged by the globule 100, when the shift lever 16 is in its "Park" position. To accomplish this, the motorist first turns on his lights by closing the headlight switch 46. With the gearshift lever 16 in "Park" position he then tilts the mercury switch 96 so as to incline its glass enevlope 98 to the extent that the mercury globule 100 moves into its bridging relationship with the contacts or terminals 102. Care should be exercised so that the mercury switch 96 is tilted only enough to just initiate closure. It is at this time that the panel board or strip is pressed against the underside of the gearshift housing 18, the adhesive 108 thereafter retaining the switch 96 in place.

When the gearshift lever 16 is moved to its next position, this being the reverse position, the mercury switch 96 will tilt sufficiently so that the globule 100 of mercury will flow away from the termianls or contacts 102 and the circuit containing the buzzer 90 will thus be opened. Further movement of the gearshift lever 16 into subsequent positions will cuase the mercury 100 to flow even more to the end of the glass envelope 98 remote from the contacts 102. When the shift lever 16 is returned to "Park" position, the gearshift housing 18 will be rotated so as to again move the mercury switch 96 so that its terminals or contacts 102 will be bridged or closed by the mercury globule 100.

From the foregoing description, the manner in which my headlight warning system operates should be readily understood. However, it can be mentioned that whenever the headlight switch 46 is opened, then the tail lamps 54 and parking lamps 56 are deenergized. On the other hand, when the headlight switch 46 is closed, not only are the headlights (not pictured but connected to the conductor 48) on but also the tail lamps 54 and parking lamps 56. Consequently, current flows from the battery 44, through the headlight switch 46 to the headlights via the conductor 48 and to the clip 40 via the conductor 50. The flow of current from the clip 40 is then through the contact member 62, through the auxiliary fuse 80 and thence through the resistors 86, 88 to the other contact member 64, resilient clip 42 and then to the tail and parking lamps 54, 56.

However, the current flow through the resistors 86, 88 produces a smalll voltage drop, preferably on the order of 1.0 volt as earlier-mentioned, which voltage is sufficient to energize the actuate the buzzer if the mercury switch 96 is closed. It will be recalled that the mercury switch 96 is deliberatly positioned when securing it to the underside of the gearshift houwing 18 so that it will be closed only when the gearshift lever 16 is in its "Part" position. Under these conditions, the buzzer 90 is sounded and the motorist is warned that he should open the headlight switch 46 in order to turn off his headlights.

On the other hand, whenever the gearshift lever 16 is in a position different from the "Park" one, then the mercury switch 96 is open, and even when the headlight switch 46 is closed, there is not way for current to flow through the buzzer 90 to energize it as when the mercury switch 96 is closed. Hence, in all operational positions of the gearshift lever 16 (including "Neutral"), there will be no sounding of the alarm and the headlights and taillights operate as usual. The small amount of resistance provided by the parallel connected resistors 86, 88 do not adversely affect the degree of illumination of the tail and parking lamps 54, 56. As far as any visual effect is concerned, these lamps 54, 56 operate with virtually the same degree of brilliance as when my plug-in system 60 is not installed. In other words, there is no noticeable difference between the degree of illumination of the lamps 54 and 56 after my system 60 is installed as compared with the brilliance derived when using the usual fuse 28 in the two clips 40, 42.

I claim:

1. A headlight warning system for plugging into the tail lamp circuit of a vehicle, comprising first and second contact members engageable with the tail lamp fuse clips in lieu of the usual tail lamp fuse, a resistor, means connecting said resistor in series with said contact members, a normally open switch, an electrically operated alarm, and means connecting said normally open switch and alarm in series with each other and in parallel with said resistor.

2. A headlight warning system in accordance with claim 1 in which said contact members include cylindrical portions engageable with the tail lamp fuse clips.

3. A headlight warning system in accordance with claim 2 in which said cylindrical portions are of sheet metal.

4. A headlight warning system in accordance with claim 3 in which said contact members include relatively flat terminals integral with said cylindrical portions, said means for connecting said resistor in series including conductors attached at one end to said terminals.

5. A headlight warning system in accordance with claim 1 in which said connecting means for said resistor includes a pair of fuse clips connected in series between said resistor and one of said contact members for engaging a fuse so that tail lamp current flowing through said first-mentioned fuse clips must flow through both said second-mentioned fuse clips and at least a portion of said tail lamp current through said resistor.

6. A headlight warning system in accordance with claim 5 in which said last-mentioned fuse clips have a spacing corresponding to the spacing of said first-mentioned fuse clips, whereby the motorist can first remove the usual fuse from said first-mentioned fuse clips and insert it into said last-mentioned fuse clips.

7. A headlight warning system in accordance with claim 1 including an additional resistor, said connecting means connecting said resistors in parallel with each other.

8. A headlight warning system in accordance with claim 1 in which said normally open switch is a mercury switch.

9. A headlight warning system in accordance with claim 8 including a layer of pressure sensitive adhesive for facilitating the mounting of said switch on a portion of the vehicle.

10. A plug-in alarm device in accordance with claim 9 in which said vehicle portion constitutes the shift lever housing of the vehicle.

11. In combination with a vehicle having incorporated therein a headlight switch and a fuse block containing a pair of fuse clips connected in circuit with a tail lamp of the vehicle, closure of said headlight switch supplying current to said fuse clips, a warning system comprising a pair of contact members releasably engaged in said fuse clips, a resistor connected between said contact members for providing a voltage drop when current is flowing through said contact members and said resistor by reason of said headlight switch being closed, a voltage responsive alarm connected across said resistor, and an auxiliary switch for normally disconnecting said alarm from said resistor, and means for closing said auxiliary switch when the vehicle is parked, whereby when said headlight switch and said auxiliary switch are closed, current flowing through said fuse clips to said tail lamp will energize said alarm by reason of said voltage drop.

12. The combination of claim 11 in which said auxiliary switch is a mercury switch and the means for closing same in the shift lever housing.

13. A headlight warning system in accordance with claim 12 including a strip having a pressure sensitive adhesive thereon, said mercury switch being mounted on said strip and said strip being attached to said shift lever housing so that said mercury switch is closed only when said housing is in its "Park" position.

* * * * *